US010762602B2

United States Patent
Cohen et al.

(10) Patent No.: US 10,762,602 B2
(45) Date of Patent: Sep. 1, 2020

(54) METHODS AND APPARATUS TO ENABLE PARALLEL PROCESSING WHEN SOLVING LINEAR EQUATIONS IN A COMPUTER VISION PROCESSING SYSTEM

(71) Applicant: Intel Corporation, Santa Clara, CA (US)

(72) Inventors: Dror Cohen, Jerusalem (IL); Avigdor Eldar, Jerusalem (IL); Amos Goldman, Jerusalem (IL); Jonathan Abramson, Givat Yearim (JM)

(73) Assignee: Intel Corporation, Santa Clara, CA (US)

(*) Notice: Subject to any disclaimer, the term of this patent is extended or adjusted under 35 U.S.C. 154(b) by 241 days.

(21) Appl. No.: 15/807,253

(22) Filed: Nov. 8, 2017

(65) Prior Publication Data

US 2019/0026865 A1    Jan. 24, 2019

(51) Int. Cl.
| | | |
|---|---|---|
| *G06T 5/00* | (2006.01) | |
| *G06K 9/40* | (2006.01) | |
| *G06T 1/20* | (2006.01) | |
| *G06F 17/16* | (2006.01) | |
| *G06F 17/12* | (2006.01) | |

(52) U.S. Cl.
CPC ............... *G06T 5/00* (2013.01); *G06F 17/12* (2013.01); *G06F 17/16* (2013.01); *G06K 9/40* (2013.01); *G06T 1/20* (2013.01); *G06T 2207/10004* (2013.01); *G06T 2207/10016* (2013.01); *G06T 2207/20021* (2013.01); *G06T 2207/30004* (2013.01); *G06T 2207/30196* (2013.01); *G06T 2207/30232* (2013.01); *G06T 2207/30261* (2013.01)

(58) Field of Classification Search
CPC ... G06T 5/00; G06T 1/20; G06T 2207/10016; G06T 2207/30004; G06T 2207/30261; G06T 2207/30232; G06T 2207/30196; G06T 2207/20021; G06T 2207/10004; G06K 9/40; G06F 17/16; G06F 17/12
See application file for complete search history.

(56) References Cited

U.S. PATENT DOCUMENTS

2009/0268085 A1* 10/2009 Myaskouvskey ....... G06F 17/12
348/441

OTHER PUBLICATIONS

Vandewalle et al, "Numerical experiments with nonlinear multigrid waveform relaxation on a parallel processor", Applied Numerical Mathematics 8 (1991), pp. 149-161. (Year: 1991).*

(Continued)

*Primary Examiner* — Yon J Couso
(74) *Attorney, Agent, or Firm* — Hanley, Flight & Zimmerman, LLC

(57) ABSTRACT

Methods, apparatus, systems and articles of manufacture to prepare a set of equations for a successive over relaxation processor are disclosed. An example apparatus includes an identifier to identify a set of equations that corresponds to pixels of an input image. Example apparatus also include a partitioner to divide the set of equations into partitions that contain mutually independent subsets of the equations and a collector to collect the subsets of the set of equations into groups, based on the partitions, to be solved in parallel by the successive over relaxation processor.

21 Claims, 7 Drawing Sheets

(56) References Cited

OTHER PUBLICATIONS

Caulfield, "Improved relaxation processor for parallel solution of linear algebraic equations", Proc. SPIE 1297, Hybrid Image and Signal Processing II; doi: 10.1117/12.21308, Technical Symposium on Optics, Electro-Optics, and Sensors, 1990, Orlando, FL, United States. (Year: 1990).*

Levin, Lischinski, and Weiss, "Colorization using Optimization," School of Computer Science and Engineering, The Hebrew University of Jerusalem, 6 pages.

Farbman et al., "Interactive Image Manipulation via Image-Guided Optimization," The Hebrew University, Microsoft Research, 64 pages.

Zhang, Lan, Ye, and Estrade, "Parallel SOR Iterative Algorithms and Performance Evaluation on a Linux Cluster," Naval Research Laboratory, Conference Proceedings, Jul. 6, 2006, 8 pages.

\* cited by examiner

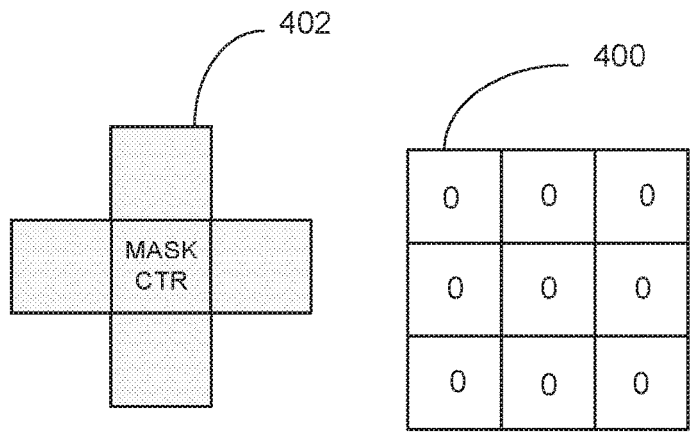
FIG. 4A
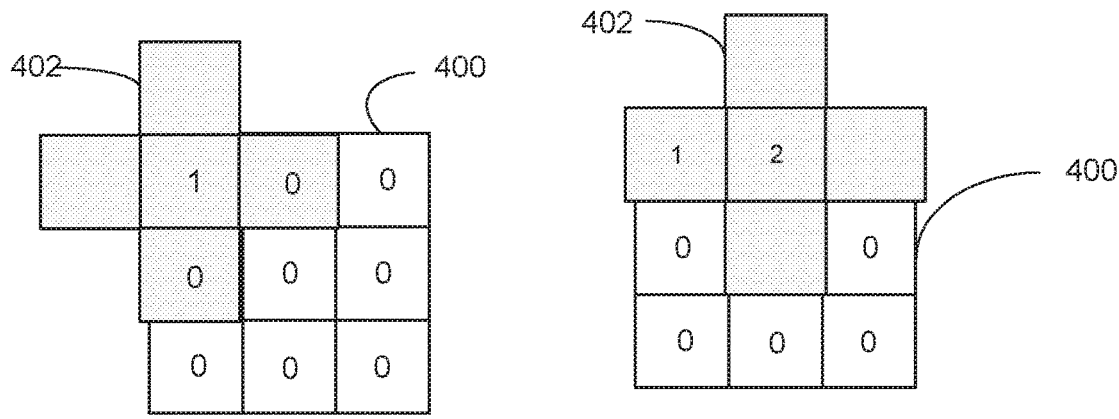
FIG. 4C
FIG. 4B
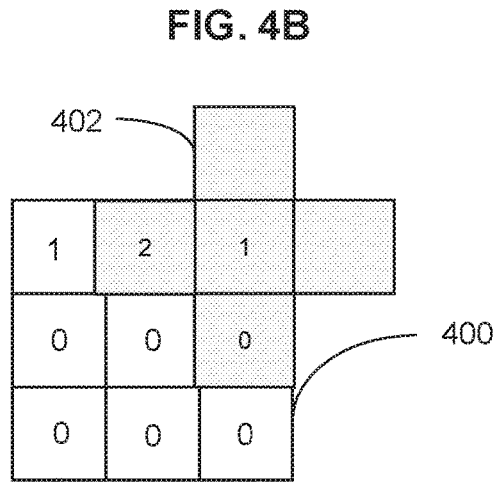
FIG. 4D
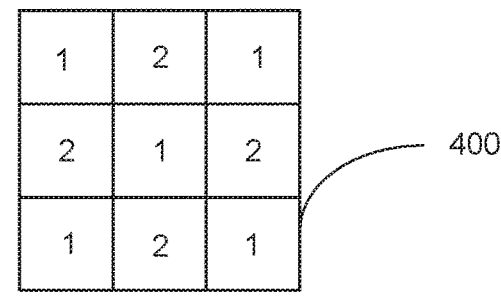
FIG. 4E

METHODS AND APPARATUS TO ENABLE PARALLEL PROCESSING WHEN SOLVING LINEAR EQUATIONS IN A COMPUTER VISION PROCESSING SYSTEM

FIELD OF THE DISCLOSURE

This disclosure relates generally to computer vision processing systems and more particularly to methods and apparatus to enable parallel processing when solving linear equations in a computer vision processing system.

BACKGROUND

Computer vision processing systems are designed to capture and analyze still and video images for the purpose of making machine-based evaluations of the contents of the captured images. In many cases, the goal of the machine-based evaluation is to recognize an activity occurring in a captured image/video recording. Once a recorded activity is recognized, information regarding the activity can be stored for later retrieval and analysis and/or actions can be performed in the vicinity of the activity. Such actions can include the actuation of one or more servo motor controllers/actuators associated with a robotic device having some form of artificial intelligence. Computer vision processing systems are used in a wide and ever-expanding variety of applications including security monitoring, quality control monitoring, assisted automobile (or other motorized) driving, computerized customer service robots, manufacturing, etc.

BRIEF DESCRIPTION OF THE DRAWINGS

FIGS. 4A, 4B, 4C, 4D and 4E are diagrams illustrating the iterative manner in which a mask is placed on the elements/cells of an initialized matrix created by the partitioner of FIG. 3. In FIG. 4A, the mask is shown beside the initialized matrix, in FIGS. 4B-4D the mask is placed on the initialized matrix, and FIG. 4E does not include the mask.

The figures are not to scale. Wherever possible, the same reference numbers will be used throughout the drawing(s) and accompanying written description to refer to the same or like parts.

DETAILED DESCRIPTION

Figure 1:
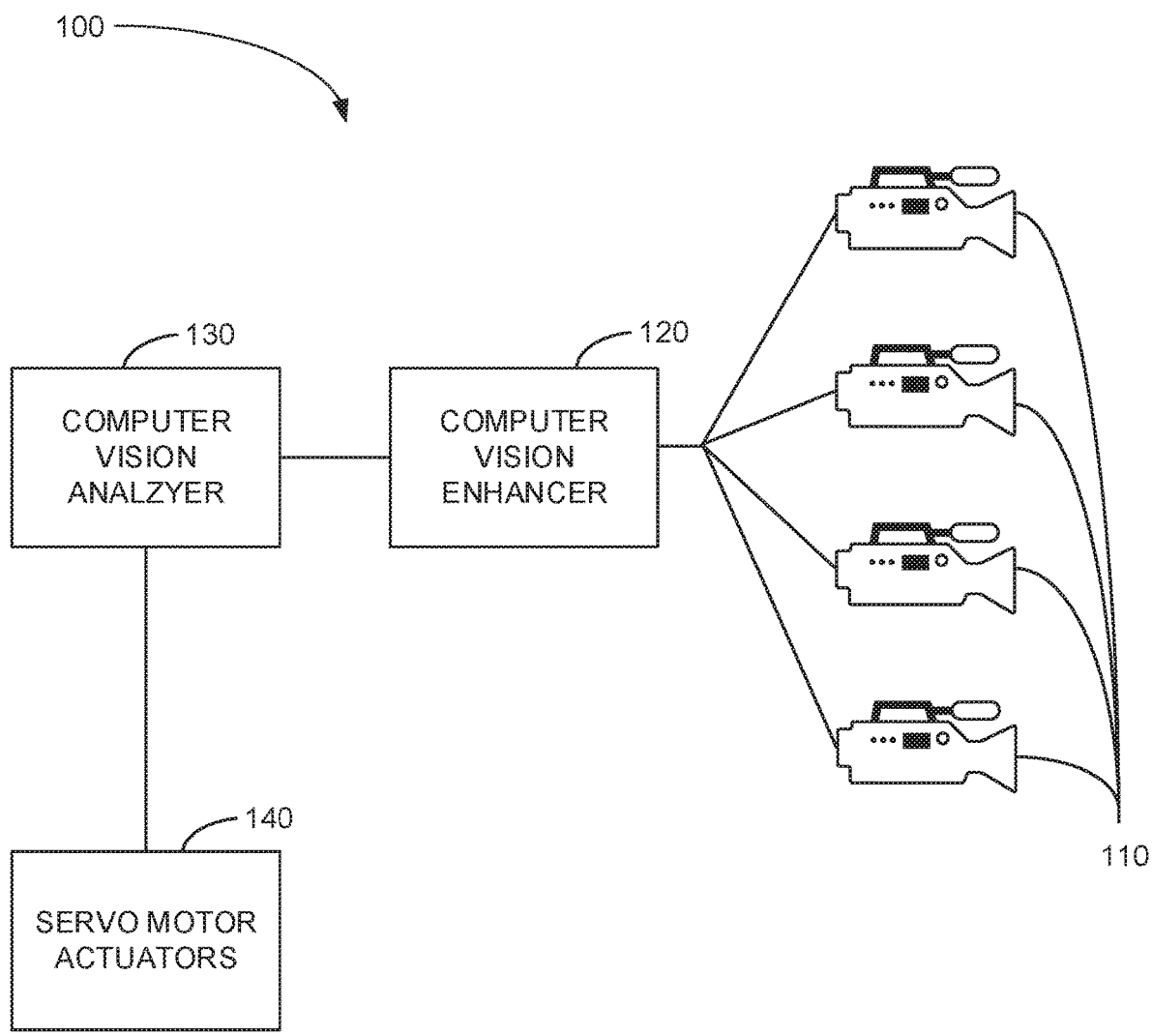
FIG. 1 is a block diagram of an example computer vision processing system constructed in accordance with the teachings of this disclosure.

Computer vision processing systems capture and analyze image and video data in an effort to perform machine-recognition of features contained in the captured image/video data. A primary goal of computer vision processing is to use machine-based technology to understand image and video information in a manner analogous to the way a human mind can understand such data. Once information contained in an image/video is understood, any number of actions can be taken based on the information. For example, computer vision systems used in the medical arts include image processing systems that capture images of the human body, automatically recognize indicators of disease in the images and provide information regarding possible diagnoses. Computer vision processing systems can also be used in assisted motor-driving applications to detect an oncoming object and take actions to evade such objects. Computer vision processing systems can further be used to monitor a premises and formulate an alert when an intruder of a specific description is detected. The possible applications in which computer vision processing systems can be used are vast and expanding.

A significant portion of the field of computer vision processing is dedicated to advancing image recognition techniques. Image recognition has proven to be a difficult task even when an image being analyzed is detailed and well lit. The task is made even more difficult when the image(s) to be analyzed are grainy, have holes (are missing pixel data), are dark, lack depth information, etc. The challenges facing computer vision experts are further compounded when two dimensional images taken by multiple cameras at different locations are used to attempt to identify and/or draw one or more conclusions about a moving (or still) object.

Many computer vision problems such as the ones identified above, as well as others, are handled using linear optimization. Linear optimizations can be used to perform any number of image enhancement techniques including hole filling (also called depth-Inpainting), optical flow estimation, colorization, alpha-blending, etc., all of which aid in image recognition. In some examples, the image enhancement techniques that use linear optimization aim to solve a large linear system represented by the equation "Ax=b" wherein "A" represents a matrix of data values, "x" represents a vector and is the variable to be determined based on the equations to be solved, and "b" represents a vector of data values. Successive over-relaxation is one such linear optimization-based technique that is used to solve for the vector "x" using the large linear system represented by a set of equations having the form "Ax=b." In some examples, a set of pixels/voxels associated with an original (e.g., unenhanced) image/video represents a set of original, unenhanced "x" values and the resulting "x" values solved with the large linear system represents enhanced "x" values. In some such examples, the enhanced "x" values together form an enhanced version of the original image/video represented by the original, unenhanced x values.

Successive over-relaxation is an iterative technique in which each iteration focuses on solving a single equation of the set of equations and each iteration is influenced by the outcome of preceding iterations. When used in the context of image/video enhancements, an equation corresponding to each pixel/voxel of image/video data is determined. The solution of an equation corresponding to a first pixel/voxel is dependent not only on first pixel/voxel data but also on neighboring pixel/voxel data values. Due to these dependencies, the equations corresponding to all of the pixels/voxels cannot be solved in parallel, but must be solved iteratively. Unfortunately, the iterative nature of the successive over-relaxation process makes successive over-relaxation a time consuming process that may not be suitable for use in real-time image processing/recognition applications. As used herein a voxel represents a value on a regular grid in three dimensional space. Voxels can be used by image rendering systems to assist in visualizing a volumetric space in two dimensions.

The computer vision processing system disclosed herein includes a computer vision enhancer having an equation parallelizer that identifies equations of a linear optimization system that can be solved in parallel. In some examples, the computer vision enhancer includes a partitioner that divides the equations to be solved into subsets. Each subset only includes equations that are mutually independent and can thus be solved in parallel. The equations to be solved in parallel are supplied by the partitioner to a collector that groups the mutually independent equations included in a subset into a same area of a matrix for delivery to a set of successive over relaxation processors. The successive over relaxation processors subsequently solve the mutually independent equations in parallel thereby greatly reducing the time required to solve the large linear optimization. In some examples, a single successive over relaxation processor uses multi-threading techniques to solve the mutually independent equations in parallel. In some examples Single Instruction Multiple Data (SIMD) processors operate in parallel to solve the mutually independent equations in parallel.

The computer vision processing systems disclosed herein are able to rapidly solve a large system of linear equations associated with image/video data. As such, such disclosed computer vision processing systems enable the usage of computer vision processing in a greater number of real-world applications in which time is of the essence.

FIG. 1 is a block diagram of an example computer vision processing system 100 having one or more video (or still image) cameras 110, an example computer vision enhancer 120, an example video/image data analyzer 130, and an example servo motor controller/actuator 140, In some examples, the cameras 110 capture a video (or still image) of a subject. The video (or still image) data captured by the cameras 110 is supplied to the computer vision enhancer 120 which applies any of a variety of image processing techniques to enhance the captured video/image data. The enhanced video/image data is then supplied to the computer vision analyzer for identifying the subject captured in the image/video data, drawing conclusions about the subject, predicting a future position of the subject based on a movement of the subject, determining an identity of the subject, determining whether to grant the subject access to an access-restricted area, and/or any number of other additional or alternative actions. The computer vision analyzer may store the information and/or actuate a servo-motor actuator based on the analyzed image/video data.

Figure 2:
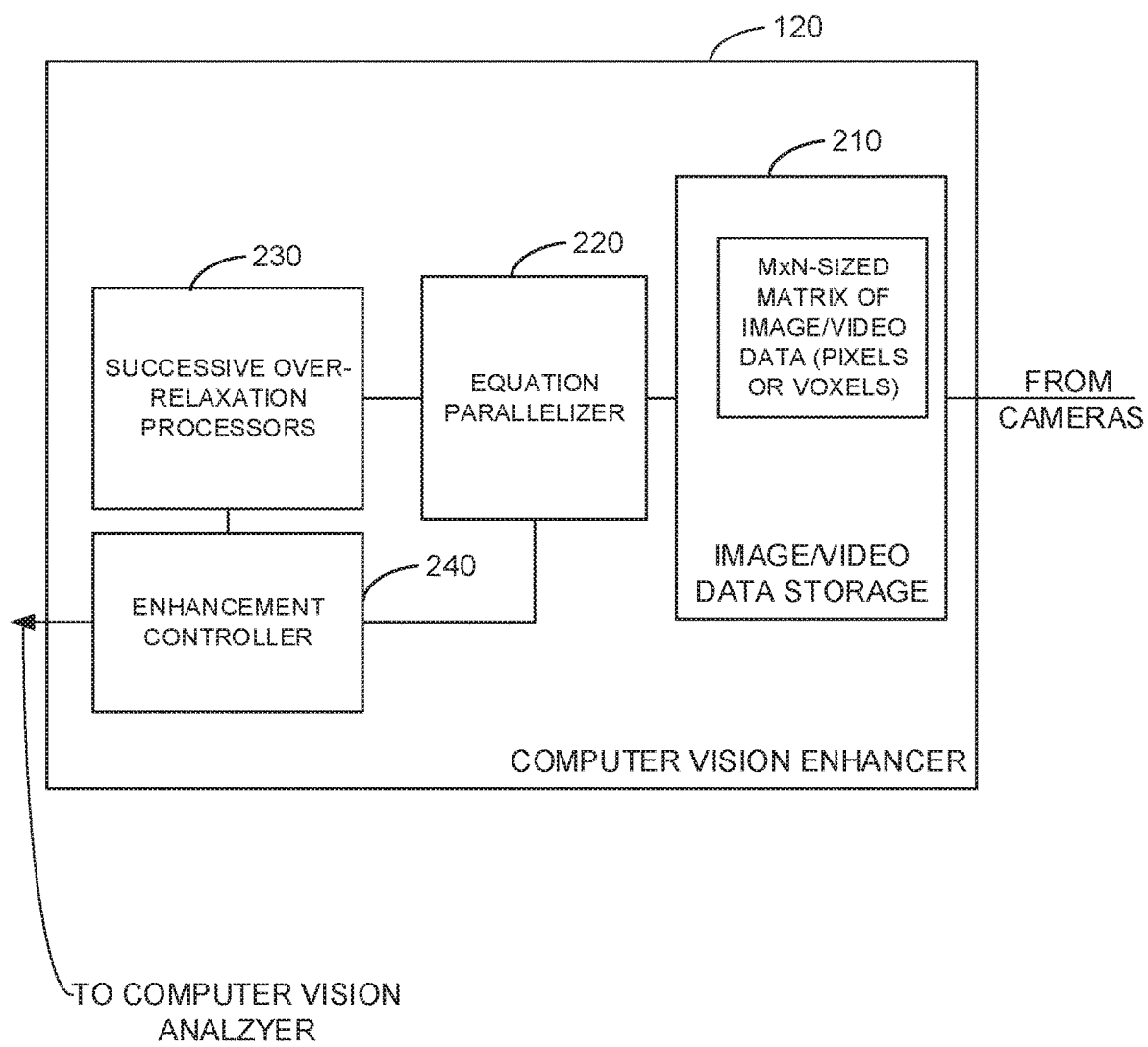
FIG. 2 is a block diagram of an example implementation of an example computer vision enhancer of FIG. 1 having an example equation parallelizer.

FIG. 2 is a block diagram of an example implementation of the example computer vision enhancer 120 of FIG. 1. The computer vision enhancer 120 includes an example image/video data storage 210, an example equation parallelizer 220, one or more example successive over-relaxation processsors 230, and an example enhancement controller 240. In some examples, the image/video data storage 210 receives captured image/video data in the form of a image/video data-filled matrix 215 from the camera(s) 110 (see FIG. 1) for storage. The enhancement controller 240 identifies an enhancement technique to be applied to the image/video data and notifies the equation parallelizer 220 of the identified enhancement technique. For example, if the captured image/video data has holes, the enhancement controller 240 may determine that that depth-filling is to be applied to the image/data. If the captured image is highly pixelated, the enhancement controller 240 may instead apply smoothing techniques on the image data, and so forth. Based on the enhancement technique to be applied, the equation parallelizer accesses the image/video data-filled matrix 215 containing stored pixel/voxel data 215, identifies sets of linear equations corresponding to the image/video data, and arranges the equations in a manner that will permit the solving of one or more sets of the equations in a parallel manner. The sets of equations are provided by the equation parallelizer 220 to the successive-over relaxation processors 230 for solving in parallel. In some examples, the manner in which the equations are supplied to the successive over-relaxation processors causes the resulting solution data to be out of order. In some such examples, the equation parallelizer 220 pixel/voxel data. The enhancement controller 240 then supplies the properly ordered results of the solved equations to the computer vision analyzer 130 (see FIG. 1). The computer vision analyzer 130 analyzes the results and uses the information to perform any number of actions, as described above.

Figure 3:
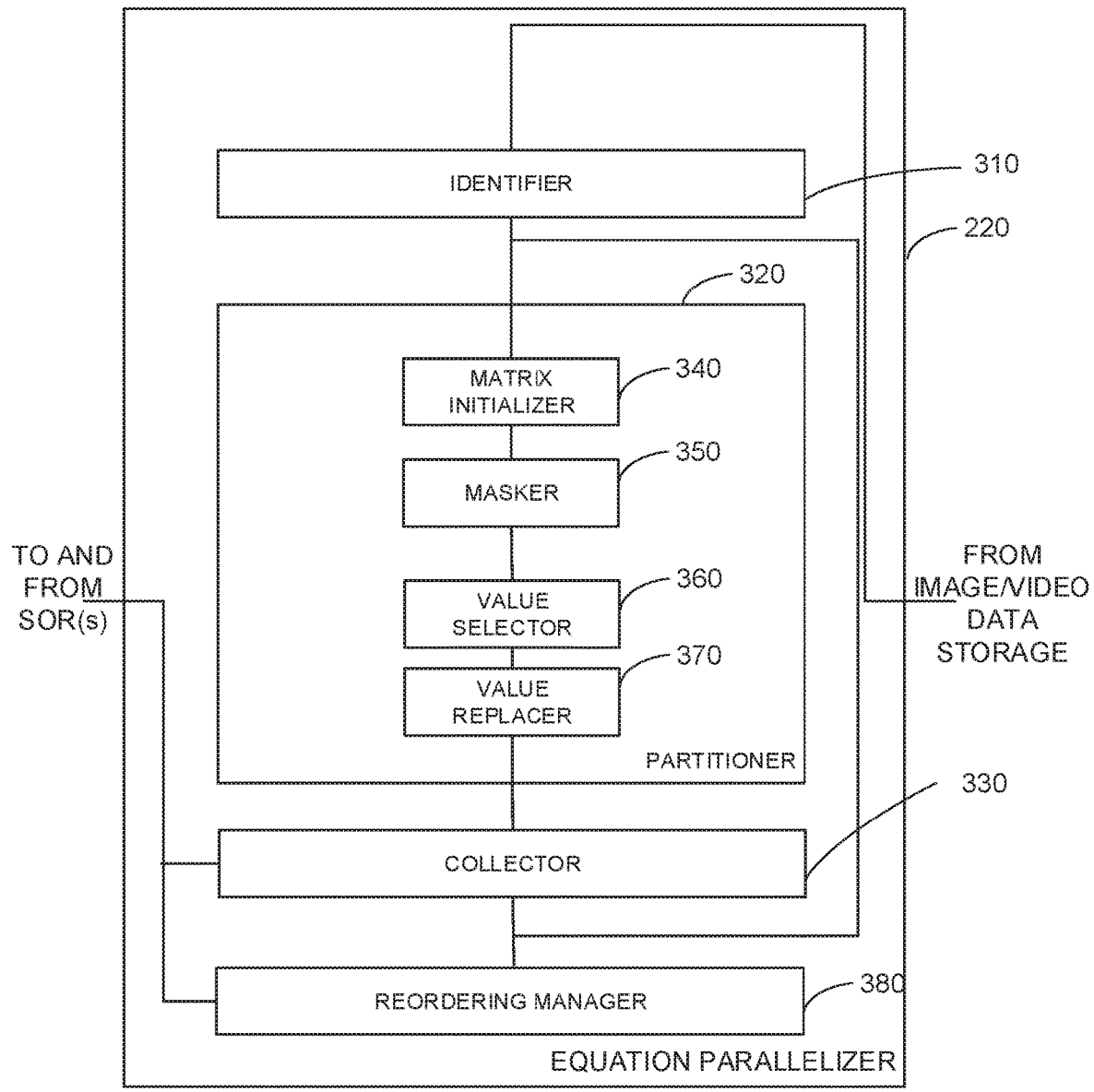
FIG. 3 is a block diagram of an example implementation of the example equation parallelizer of FIG. 2 having an example partitioner.

FIG. 3 is a block diagram of an example implementation the example equation parallelizer 220 of FIG. 2. The example equation parallelizer 220 of FIG. 3 includes an example identifier 308, an example identifier storage 310 to store an example M×N-sized equation-filled matrix 311, an example partitioner 330, an example collector 340, an example initializer storage 372 to store an example initialized matrix 374, an example collector storage 376 to store an example M×N-sized rearranged equation-filled matrix 378, an example reordering manager 380, and an example reordering storage 382 to store an example M×N-sized reordered matrix 384 and an example solution-filled matrix 386. In some examples, the partitioner 330 includes an example matrix initializer 340, an example masker 350, an example value selector 360, and an example value replacer 370. In some examples, the enhancement controller 240 (see FIG. 2) determines an enhancement to be applied to the image/video data and informs the identifier 308 of the technique to be applied. The identifier 308 responds to the notification by accessing the image/video data-filled matrix 215 stored in the example image/video data storage 210 (see FIG. 2). Based on the type of enhancement to be applied, the identifier 308 identifies equations corresponding to the image/video data. Each equation corresponds to one of the pixels/voxels of the image/video data stored in the image/video data-filled matrix 215. In some examples, the equations correspond to a set of assumptions made about the image/video data and the relationships between neighboring pixels/voxels included in the image/video data. The assumptions may be supplied to the identifier 308 by the enhancement controller 240. The assumptions are based on the type of enhancement technique to be applied to the image/video data. In some examples, the assumptions are related to the influence neighboring pixels/voxels have on each other.

The equations identified by the identifier 308 are linear equations that, when solved, result in an enhanced version of the image/video data. The linear equations can correspond to any number of image enhancing techniques including smoothing, depth-filling, etc. As described above, the linear equations generally take the form "Ax=b" wherein "A" corresponds to a matrix of coefficients, and "b" corresponds to a vector of constraints. The values of the two are based at least in part on the input image/video data. The vector "x" corresponds to a vector of unknown values, to be estimated in the linear equation solving process. The image/video data is stored in an image/video data matrix having M×N dimensions. In some examples, the image/video data is pixel or voxel data. The identifier 308 places the equations to be solved in the equation-filled matrix 311 also having M×N dimensions. The equations contained in the elements of the equation-filled matrix 311 correspond to the image/video data-filled matrix 215 containing the image/video data. In some examples, the image/video data stored in an element of the image/video data-filled matrix 215 is supplied as input to the equation(s) stored in a corresponding element of the equation-filled matrix. The equations are solved by the successive over-relaxation processors 230 as described further below.

The example partitioner 320 of FIG. 3 partitions or divides the equations into sets of equations that can be solved in parallel. As described above, a first equation (Eq 1) corresponding to an example first pixel (P1) of image data may be dependent on the solution of second, third, fourth, (and so forth equations) (e.g., Eq 2, Eq 3, Eq 4) corresponding to one or more other pixels (P2, P3, P4) stored in the image/video data-filled matrix 215. As a result, the first equation (Eq 1) may not be solveable in parallel with the one or more of the second, third, fourth, etc., equations (Eq2, Eq3, Eq4). The need to solve the equations (e.g., Eq 1, Eq 2, Eq 3, Eq 4) in a non-parallel manner causes the processing (e.g., enhancing) of the image/video data in the image/video data-filled matrix 215 to be time consuming, and limits the ability to perform enhancement techniques in real-time or near real-time applications. By partitioning the equations into sets of mutually independent equations that can then be solved in parallel, the partitioner 320 greatly enhances the capabilities of the computer vision enhancer 120 (see FIG. 1 and FIG. 2) by permitting the application of image/video enhancement techniques in real-time or near real-time.

In some examples, the example matrix initializer 340 initializes the initialized matrix 374 having the same dimensions as the equation-filled matrix 311 and the same dimensions as the image/video data-filled matrix 215 (e.g., "M×N"). The elements of the initialized matrix 374 are all zero values (e.g., every element of the matrix initially holds a zero). The matrix initializer 340 notifies the example masker 350 when the matrix initialization is complete. The masker 350 responds to the notification by identifying/selecting a mask having a desired shape to be applied to the elements of the initialized matrix. The mask shape is selected based on the image processing problem to be solved, and reflects the dependency/connectivity between each pixel/voxel in the image and its surrounding pixels/voxels, defined by the matrix A. A larger mask covers more pixels/voxels and indicates a stronger dependency on neighboring pixels/voxels. The masks can have any needed shape. Each mask includes a set of squares corresponding to the elements of the initialized matrix 374. The squares of each mask are symmetrical about a center square of the mask. FIG. 4A provides an illustration of the example initialized matrix 374 and an example mask 402. The masker 350 places the selected mask 402 on the elements of the initialized matrix 374 in an iterative manner such that during each iteration, the masker 350 places the center of the mask on a different one of the elements of the initialized matrix. Placement of the mask on the initialized matrix causes one or more elements of the matrix to be covered by the mask 402 and one or more matrix elements to not be covered by the mask 402. In some examples, the masker 350 places the mask 402, during a first iteration, with the mask center (MASK CTR) positioned on a first element (left-most) of the first row of the initialized matrix. During a second iteration, the masker 350 shifts the mask 402 to the right by one matrix element such that the mask center (MASK CTR) is positioned over a second matrix element that is one element to the right of the first element of the first row of the matrix and in a same row (e.g., the first row) as the first element. In some examples, the masker 350 continues to move the mask 402 in the manner described during each iteration until the center of the mask (MASK CTR) has been placed over the last (right-most) element in the first row of the initialized matrix 402. At that time, the masker 350 moves the center of the mask cover the first (left-most) element of a second row of the initialized matrix 402. The masker 350 continues to place the center of the mask over the elements of the initialized matrix in the manner described (e.g., proceeding from left to right through each element of each row before proceeding to a next consecutive row of the matrix and again moving through the row in left- to right fashion).

In some examples, in addition to moving the mask over the elements of the initialized matrix 374 in the iterative fashion described above, during each iteration, the example value selector 360 and the example value replacer 370 operate to populate the initialized matrix 374 with non-negative integer values as follows. After the example masker 350 has placed the mask 402 on an element of the initialized matrix 374 in an iteration, the masker 350 notifies the value selector 360. The value selector 360 responds to the notification by selecting a value to be placed in the matrix element over which the center of the mask (MASK CTR) is positioned. In some examples, the value selector 360 selects a non-negative integer value (e.g., 0, 1, 2, . . . ). In some such examples, the value selector 360 selects a lowest (e.g., 0) of the non-negative integer values (e.g., 0, 1, 2, . . . ) provided that the lowest of the non-negative integer values is not in any of the matrix elements that are covered by the mask 402. If the lowest of the non-negative integer values is in one or more of the matrix elements covered by the mask 402, the value selector 360 selects a next lowest of the non-negative integer values (e.g., 1) provided that the next lowest of the non-negative integer values is not in any of the elements of the initialized matrix 374 that are covered by the mask 402. If the next lowest (e.g., 1) of the non-negative integer values is in one or more of the matrix elements covered by the mask 402, the value selector 360 selects a next lowest (e.g., 2) of the non-negative integer values as compared to the last non-negative integer value (e.g., 1). The value selector 360 continues in this fashion until a non-negative integer value meeting the criteria ((e.g., is a lowest of all possible non-negative integer values that do not reside in any matrix element covered by the mask 402) is selected for the matrix element covered by the mask center (MASK CTR).

FIG. 4B illustrates the example initialized matrix 374 in which the center of the mask 402 is centered on a first element of the initialized matrix. FIG. 4C illustrates the example initialized matrix 374 with the center of the mask 402 centered on a second element of the initialized matrix 374 and FIG. 4D illustrates the example initialized matrix 374 with the center of the mask centered on a third element of the initialized matrix. When the example masker 350 places the mask on the initialized matrix 374 during a first iteration (see FIG. 4B), the center of the mask is disposed on a first element of the initialized matrix. The example value selector 360 then proceeds to identify a value to be placed in the first element of the initialized matrix. In this first iteration, the value selector initially selects the lowest non-negative integer of zero and then determines whether the value of zero lies in any of the elements of the matrix that are covered by the mask during the first iteration. As can be seen, the value of zero lies in several of the elements of the initialized matrix 374 that are covered by the mask during the first iteration such that the value selector 360 chooses a next lowest non-negative integer value (e.g., 1) as compared to the previously evaluated non-negative integer value of zero. Now the value selector 360 determines whether any of the elements of the initialized matrix 374 covered by the mask 402 hold the value 1. In this example, none of the matrix elements covered by the mask hold a value of 1. As a result, the value selector selects the value 1 for placement into the first element of the initialized matrix 374. The value selector 360 supplies the selected value of 1 to the value replacer 370 which replaces the value of zero currently stored in the first element of the matrix with the value of 1. After replacing the value zero stored in the first element with a value of 1, the value replacer 370 notifies the masker 350 which begins a second iteration by moving/shifting the mask 402 so that a second element of the initialized matrix 374 is covered by the mask center (MASK CTR) (see FIG. 4C).

The example masker 350 again notifies the example value selector 360 which responds by selecting a value to be placed in the second element of the initialized matrix 374. Referring now to FIG. 4C, the value selector 360 first selects the lowest non-negative integer value of zero and then compares the value of zero to the values held by the elements of the initialized matrix 374 covered by the mask 402. The value of zero is held in at least one of the elements of the initialized matrix 374 covered by the mask 402 such that the value selector 360 discards the zero value and instead selects the next lowest non-negative integer value of 1. The value selector 360 determines that at least one of the elements of the initialized matrix 360 that is covered by the mask 402 holds/stores the value 1 such that the value selector 360 discards the value 1 and instead selects the next lowest non-negative integer value of 2. Next, the value selector 360 determines that none of the elements of the initialized matrix 374 that are covered by the mask during the current iteration holds/stores the value of 2 and, thus, selects the value of 2 to be placed into the second matrix element. The value selector 360 supplies the selected value of 2 to the value replacer 370 which responds by replacing the currently stored zero value in the second element of the initialized matrix 374 with the value 2. After replacing the zero value stored in the second element of the initialized matrix 374 with a value of 2, the value replacer 370 notifies the masker 350 which begins a third iteration by moving/shifting the mask 402 so that a third element of the initialized matrix 374 is covered by the mask center (MASK CTR) (see FIG. 4D). The masker 350 again notifies the value selector 360 which responds by selecting a value to be placed in the third element of the initialized matrix 374.

Referring now to FIG. 4D, the value selector 360 first selects the lowest non-negative integer value of zero and then compares the value of zero to the values held by the matrix elements covered by the mask 402. The value of zero is held in at least one of the matrix elements covered by the mask such that the value selector 360 discards the value zero and instead selects the next lowest non-negative integer value of 1. The value selector 360 determines that none of the elements of the matrix covered by the mask during the third iteration holds/stores the value of 1 such that the value selector 360 selects the value of 1 to be placed into the third element of the initialized matrix 374. The value of 1 is supplied to the value replacer 370 which responds by replacing the currently stored zero value of the third element of the initialized matrix 374 with the value of 1.

The example masker 350, the example value selector 360, and the example value replacer 370 continue to mask the elements of the initialized matrix 374, and select/replace values stored in the elements of the initialized matrix 374 in the manner described above until a number of iterations equal to the number of elements (e.g., "M×N") of the initialized matrix 374 have been performed, at which time all of the elements of the initialized matrix 374 have been populated with one of a set of non-negative integer values as illustrated in FIG. 4E. As can be seen by referring to FIG. 4E, the populated matrix 374 includes two partitions (subsets) of elements/cells, a first partition corresponding to all elements/cells populated with the value 1 and a second partition corresponding to all elements/cells populated with the value 2. Thus, all of the equations corresponding to the cells of the now-populated initialized matrix 374 having a 1 can be solved in parallel and all of the equations corresponding to the cells of the now-populated initialized matrix 374 having a 2 can be solved in parallel.

Referring again to FIG. 3, the example value replacer 370 supplies the now-populated initialized matrix 374 to the example collector 330. The collector 330 uses the now-populated initialized matrix 374 to rearrange the equations stored in the equation-filled matrix 311. In some examples, the collector 330 accesses the equation-filled matrix 311 stored in the identifier storage 310 and uses the equation-filled matrix 311 to create the rearranged equation-filled matrix 378. In the rearranged equation-filled matrix 378, the equations stored in the elements of the equation-filled matrix 311 have been rearranged based on the contents of the now-populated initialized matrix 374. In some such examples, the elements of the equation-filled matrix 311 having a same non-negative integer value in the now-populated initialized matrix 374 are grouped together in the rearranged equation-filled matrix 378. In some such examples, all of the elements of the equation-filled matrix 374 having a value of 1 stored in an element located at the same position in the now-populated initialized matrix 374 are collected together in a set of rows of the rearranged equation-filled matrix 378. Likewise, all of the equations stored in the elements of the equation-filled matrix 311 having a value of 2 stored in an element located at the same position in the now-populated initialized matrix 374 are collected in a set of rows of the rearranged equation-filled matrix 374. The collector 330 continues to collect the remaining equations in this manner until all of the equations in the equation-filled matrix 311 have been collected together according to the corresponding elements of the now-populated initialized matrix 374 and are stored in the rearranged equation-filled matrix 378. The collector 330 then supplies the rearranged equation-filled matrix 378, in which the equations have been collected/grouped together in the manner described, to the example successive over-relaxation processor(s) 230 (see FIG. 2). The successive over-relaxation processor(s) 230 solve the equations contained in a same row of the rearranged equation-filled matrix 378 in parallel using SIMD processors, multi-threaded programming, etc. Solving the equations contained in the same row of the rearranged equation-filled matrix 378 in parallel greatly reduces the processing time required to solve all of the equations of the rearranged equation-filled matrix 378 thereby making the computer vision enhancer 120 suitable for uses in real-time computer vision processing applications.

In the illustrated example, the solution values are supplied by the example successive over-relaxation processor(s) 230 to the example reordering manager 380 of the example equation parallelizer 220. In some examples, the reordering manager 380 stores the solution values in an example solution-filled matrix 386 in the example reordering storage 382. The reordering manager 380 moves (re-orders) the solution values contained in the elements of the solution-filled matrix 386 to elements that the corresponding equations occupied before being collected together by the example collector 330. In some examples, the final, reordered solution values of the solution-filled matrix 386 (stored as the example reordered matrix 384) form an enhanced image/video that is subsequently transmitted by the enhancement controller 240 to the example computer vision analyzer 130 (see FIG. 1) for use in taking any of the actions described above.

While an example manner of implementing the computer vision enhancer 120 of FIG. 1 is illustrated in FIG. 2 and in FIG. 3, one or more of the elements, processes and/or devices illustrated in FIG. 2 and FIG. 3 may be combined, divided, re-arranged, omitted, eliminated and/or implemented in any other way. Further, the example computer vision image/video data storage 210, the example equation parallelizer 220, the example successive-over relaxation processors 230, the example enhancement controller 240, the example identifier 308, the example identifier storage 310, the example partitioner 320, the example collector 330, the example matrix initializer 340, the example masker 350, the example value selector 360, the example value replacer 370, the example initializer storage 372, the example reordering manager 380, the example collector storage 376, the example reordering storage 382, and/or, more generally, the example computer vision enhancer 120 may be implemented by hardware, software, firmware and/or any combination of hardware, software and/or firmware. Thus, for example, any of the example computer vision image/video data storage 210, the example equation parallelizer 220, the example successive-over relaxation processors 230, the example enhancement controller 240, the example identifier 308, the example identifier storage 310, the example partitioner 320, the example collector 330, the example matrix initializer 340, the example masker 350, the example value selector 360, the example value replacer 370, the example initializer storage 372, the example collector storage 376, the example reordering manager 380, the example reordering storage 382, /or, more generally, the example computer vision enhancer 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example computer vision enhancer 120, the example computer vision image/video data storage 210, the example equation parallelizer 220, the example successive-over relaxation processors 230, the example enhancement controller 240, the example identifier 308, the example identifier storage 310, the example partitioner 320, the example collector 330, the example matrix initializer 340, the example masker 350, the example value selector 360, the example value replacer 370, the example reordering manager 380, the example collector storage 376, and/or the example reordering storage 382 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computer vision enhancer 120 of FIG. 1 may include one or more elements, processes and/or devices in addition to, or instead of, those illustrated in FIG. 2 and FIG. 3, and/or may include more than one of any or all of the illustrated elements, processes and devices.

Figure 5:
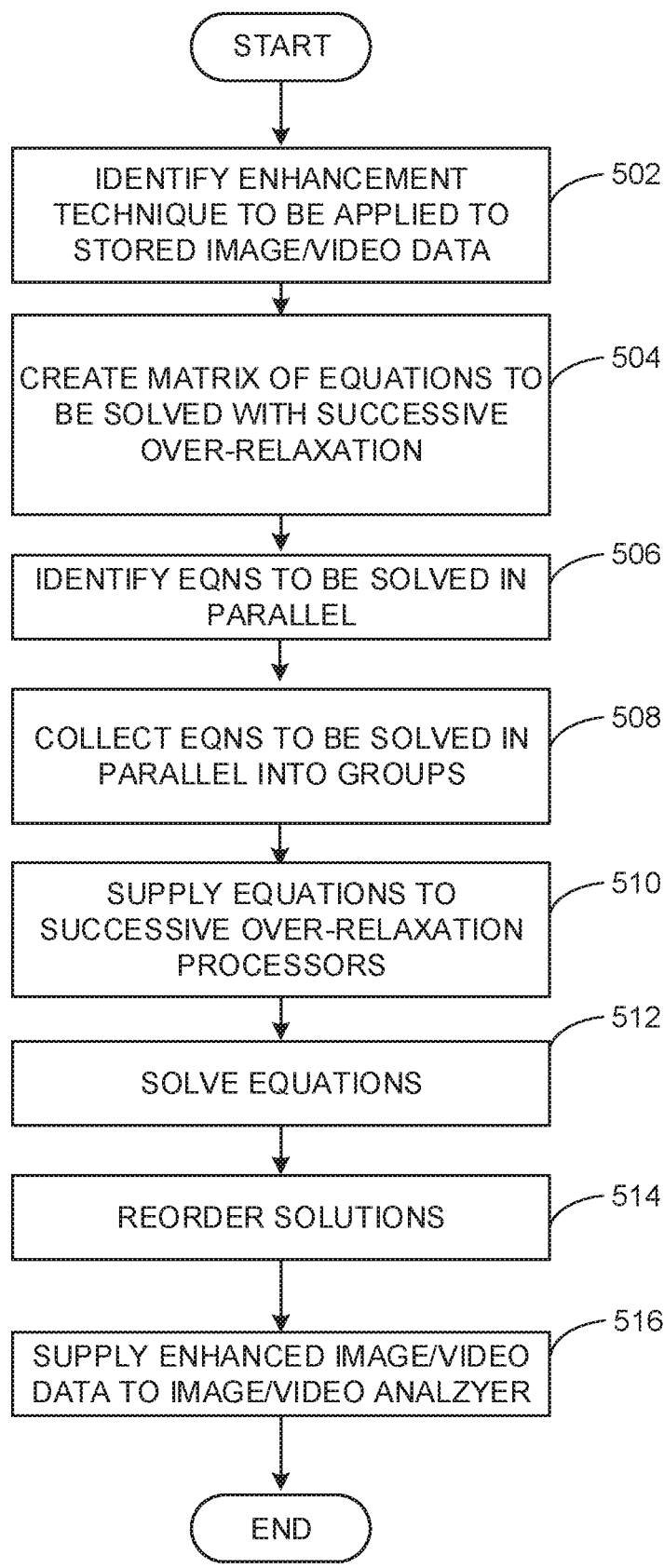
FIG. 5 is a flow chart representative of example machine readable instructions which may be executed to implement the example equation parallelizer of FIG. 3.
Figure 6:
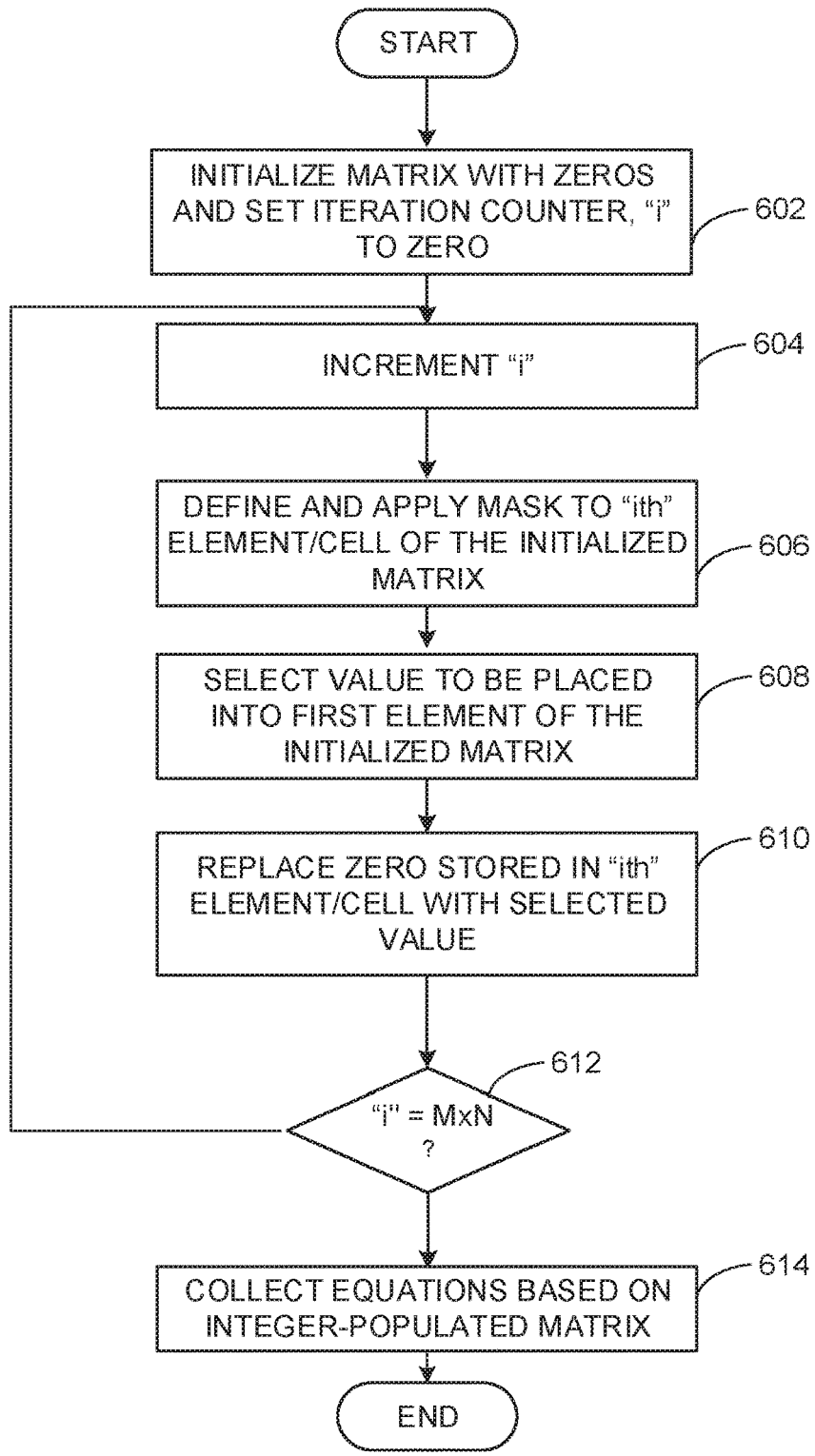
FIG. 6 is a flow chart representative of example machine readable instructions which may be executed to implement the example partitioner of FIG. 3.

Flowcharts representative of example machine readable instructions for implementing the computer vision enhancer 120 of FIG. 1 and FIG. 2 are shown in FIGS. 5 and 6. In these examples, the machine readable instructions comprise a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5 and 6, many other methods of implementing the example computer vision enhancer 120 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program 500 of FIG. 5 begins at block 502 at which the example enhancement controller 240 (see FIG. 2) accesses a set of image/video data stored in the example image/video data storage 210 and identifies an enhancement technique to be applied to the image/video data. As described above, the enhancement technique can include any of smoothing, indepth filling, blending, colorizing, etc. The image/video data is stored as an image/video data matrix and the image/video data stored in the elements of the image/video matrix are pixels or voxels that together, form an image or a frame of video. In some examples, the image/video data matrix is M×N dimensions.

Based on the enhancement technique to be applied, the identifier 308 of the example equation parallelizer 220 (see FIG. 2) identifies a set of equations to be solved in connection with the image/video data (block 504). In some examples, the identifier 308 creates a matrix containing the equations having the same dimensions as the matrix of image/video data. The example partitioner 320 of the equation parallelizer 220 identifies the equations contained in the equation-filled matrix that can be solved in parallel (block 506). After partitioner 320 identifies the equations to be processed (e.g., solved) in parallel, the example collector 330 of the equation parallelizer 220 arranges the identified equations in a manner that facilitates supplying equations to be solved in parallel at a same time to the example successive over-relaxation processors 230 (block 508). In some examples, the collector 330 collects the equations that can be solved in parallel into a same row or sets of rows of the equation-filled matrix. The collector 330 supplies the newly ordered equations (in the matrix) to the successive-over-relaxation processors 230 (block 510). In some examples, the equations are supplied to the successive over-relaxation processors 230 in a matrix that is formatted so that all of the equations contained in a same row are to be solved in parallel. In some examples, the equations are supplied to the successive over-relaxation processors 230 so that all equations contained in multiple ones of the rows are to be solved in parallel. The successive over-relaxation processors 230 solve the equations supplied by the equation parallelizer 220 (block 512) to produce a matrix of solution data (e.g., the solution-filled matrix 386). In some examples, the successive over-relaxation processors 230 are configured to process equations contained in a same row or multiple rows at a same time (e.g., in parallel). The example successive over-relaxation processors 230 supply the matrix of solution data to a solution reordering manager 380 of the example equation parallelizer 220. Once the equations have been solved, the resulting solution data represents an enhanced version of the original image/video data stored in the image/video data storage 210. The solution reordering manager 380 rearranges the order of the solution data in the solution filled matrix 386 to match the order of the image/voxel data in the image/video matrix 215 stored in the image/video data storage 210 (block 514). Thus, if the first equation corresponding to the first element of the equation-filled matrix 311 (see FIG. 3) was moved from the first element of the equation-filled matrix 311 to a second element of the equation-filled matrix 311 during the parallelization process, then the solution data stored in the second element of the solution-filled matrix 386 will be moved to the first element of the reordered matrix 384. The reordered solution data stored in the reordered matrix 384 forms the enhanced image/video. Thereafter, the reordered solution data (e.g., enhanced image/video data) is supplied by the enhancement controller 240 (see FIG. 2) to the computer vision analyzer 130 (see FIG. 1) (block 516) for use in analyzing the subject of the image/video data and/or taking actions based on the subject of the image/video data. As described above, taking actions based on the subject of the image/video data can include any number of action such as updating an intelligence report regarding the subject, actuating one or more servo motors via one or more servo motor actuators, providing a notification regarding the presence of the subject to a security monitoring system, etc. After the enhanced image/video data is supplied to the computer vision analyzer 130 and/or one or more actions are taken based on the enhanced image, the program ends.

The program 600 of FIG. 6 represents the example operations performed by the example partitioner 320 (see FIG. 3) of the example equation parallelizer 220 (see FIG. 2 and FIG. 3) FIG. 6 is an example implementation of the block 506 and the block 508 of the program 500 of FIG. 5. In some examples, the program 600 begins at a block 602 at which the example matrix initializer 340 (see FIG. 3) initializes a matrix (e.g., the initialized matrix 374) having the same dimensions as the image/video matrix 215 (see FIG. 2) (e.g., M×N) with all zero values (e.g., every element of the initialized matrix 374 holds a zero). In some examples, the matrix initializer 340 also sets an iteration counter "i," equal to zero and then notifies the example masker 350 (see FIG. 3) that the initialization of the initialized matrix 374 is complete.

The example masker 350 (see FIG. 3) responds to the notification by incrementing the iteration counter by a value of 1 and then determining whether the iteration counter, "i," is equal to "M×N" (block 604). If the iteration counter, "i," does not equal M×N, the masker 350 defines a mask to be applied to the elements/cells of the initialized matrix 374 and places the mask on the initialized matrix (block 606). The mask is selected based on the processing problem to be solved (e.g., type of enhancement to be applied), and reflects the dependency/connectivity between the pixels/voxels in the image/video data and its surrounding pixels/voxels, defined by the matrix A. As described above, a larger mask corresponds to a stronger dependency and a smaller mask corresponds to a weaker dependency. At the block 606, the masker 350 places the mask on the initialized matrix 374 such that the center of the mask is disposed on the "ith" element/cell of the initialized matrix. In addition, the masker 350 notifies the example value selector 360 that the mask has been placed (also at the block 606). The value selector 360 responds to the notification by selecting a value to be placed in the matrix element over which the mask center (MASK CTR) (see FIG. 4A) resides during the corresponding (e.g., ith") iteration (block 608). In some examples, the value selector 360 selects a non-negative integer value (e.g., 0, 1, 2, . . . ). In some such examples, the value selector 360 selects a lowest (e.g., 0) of the non-negative integer values (e.g., 0, 1, 2, . . . ) provided that the lowest of the non-negative integer values is not in any of the elements of the initialized matrix 374 that are currently covered by the mask. If the lowest of the non-negative integer values is in one or more of the elements of the initialized matrix 374 that is/are covered by the mask, the value selector 360 selects a next lowest of the non-negative integer values (e.g., 1) provided that the next lowest of the non-negative integer values is not in any of the elements of the initialized matrix 374 that is/are covered by the mask. If, the next lowest (e.g., 1) of the non-negative integer values is in one or more of the matrix elements covered by the mask, the value selector 360 selects a next lowest (e.g., 2) of the non-negative integer values as compared to the last non-negative integer value (e.g., 1). The value selector 360 continues in this fashion until a non-negative integer value meeting the criteria ((e.g., is a lowest of all possible non-negative integer values that do not reside in any matrix element covered by the mask) is selected for the element of the initialized matrix 374 that is covered by the mask center (MASK CTR).

After selecting the non-negative integer value, the value selector 360 supplies the selected value of 1 to the value replacer 370 which replaces the value of zero currently stored in the first element of the matrix with the value of 1 (block 610).

After replacing the zero value zero stored in the "ith" element with a selected value, the value replacer 370 determines whether additional elements of the initialized matrix are to be processed by determining whether the iteration counter "i" is equal to "M×N" (also at the block 612). If not, there are additional elements/cells of the initialized matrix 374 to be processed and program 600 returns to the block 604 at which the iteration counter is again incremented. The blocks 604-610 are repeated until all of the elements/cells of the initialized matrix have been processed.

When all of the elements/cells have been processed (e.g., "i"=M×N), the example value replacer 370 supplies the initialized matrix that has been populated with non-negative integer values (now referred to as the now-populated initialized matrix 374) to the example collector 330. The example collector 330 uses the now-populated initialized matrix 374 to rearrange the contents of the elements/cells of the equation-filled matrix (block 614). In some examples, the collector 330 causes the equations stored in the elements of the equation-filled matrix 311 to be rearranged based on the contents of the now-populated initialized matrix 374. In some such examples, the elements of the equation-filled matrix 311 having a same non-negative integer value in the populated matrix are collected/grouped together in the equation-filled matrix 311. In some such examples, all of the elements of the equation-filled matrix 311 having a value of 1 stored in an element located at the same position in the populated matrix are collected together in a set of rows of the equation-filled matrix. Likewise, all of the equations stored in the elements of the equation-filled matrix 311 having a value of 2 stored in an element located at the same position in the now-populated initialized matrix 374 are collected in a set of rows of the equation-filled matrix 311. The collector 330 continues to collect the remaining equations until all of the equations have been collected together according to the corresponding elements of the now-populated matrix 374. In some examples, the collector 330 stores the rearranged equations in the rearranged equation-filled matrix 378 in the collector storage 376. The equations stored in the rearranged equation-filled matrix 378 are now ready to be solved such that the equations corresponding to a same row of the rearranged equation-filled matrix 378 can be solved in parallel and the program 600 ends.

Figure 7:
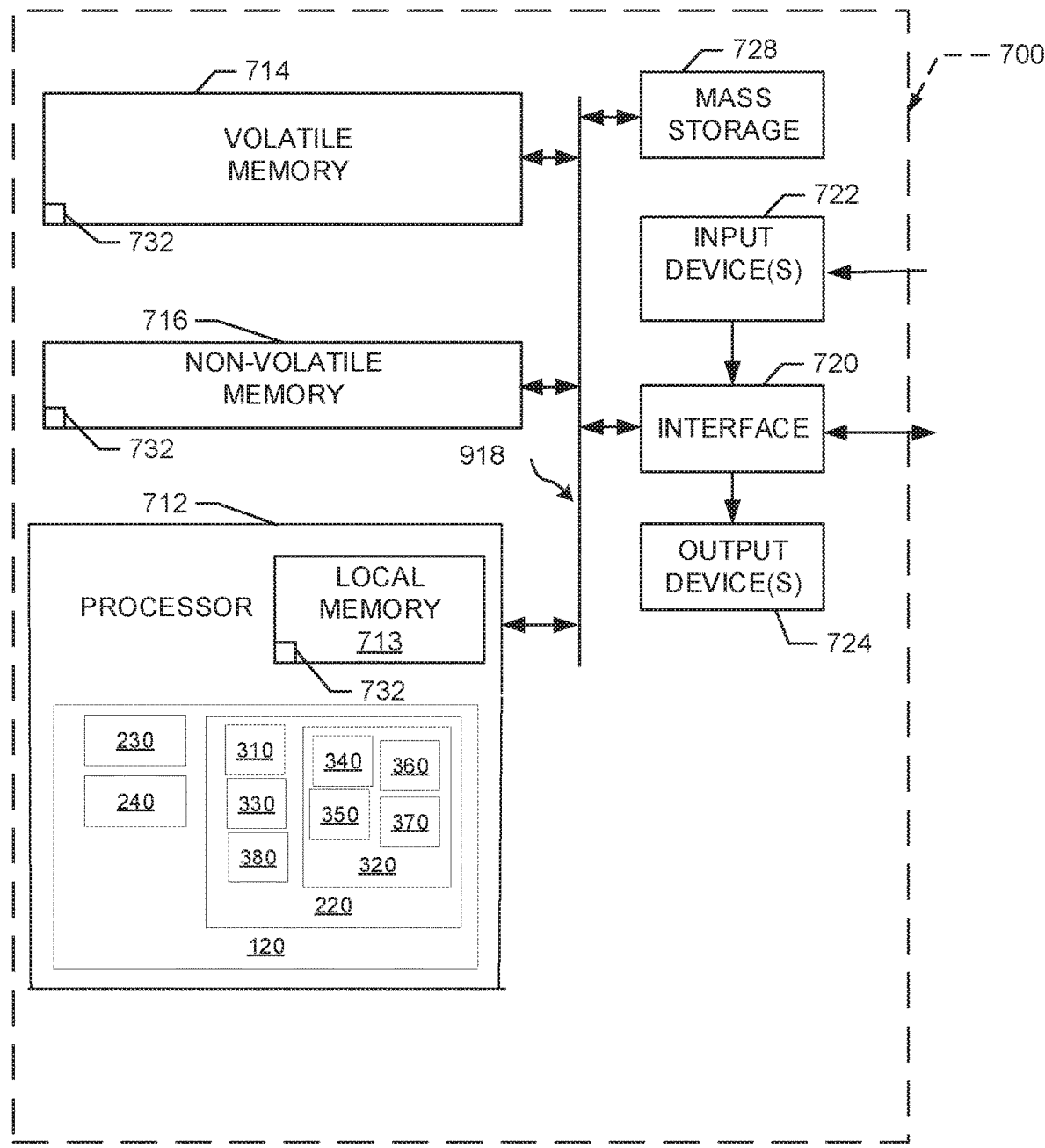
FIG. 7 is a block diagram of an example processor platform capable of executing the instructions of FIGS. 4-6 to implement the example computer vision enhancer of FIG. 1 and FIG. 2.

FIG. 7 is a block diagram of an example processor platform 700 capable of executing the instructions of FIGS. 5 and 6 to implement the apparatus of FIGS. 2 and 3. The processor platform 700 can be, for example, a server, a personal computer, a mobile device (e.g., a cell phone, a smart phone, a tablet such as an iPad™), a robot, an unmanner aerial vehicle (UAV), a manufacturing control processor, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The hardware processor may be a semiconductor based (e.g., silicon based) device. In this example, the processor 712 implements the example computer vision enhancer 120, the example equation parallelizer 220, the example successive over-relaxation processor 230, the example enhancement controller 240, the example identifier 308, the example matrix initializer 340, the example masker 350, the example value selector 360, the example value replacer 370, the example reordering manager 380, and the example collector 330.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller. In this example, any of the volatile memory 714, the non-volatile memory 716, and/or the local memory 713 implement any of the example image/video data storage 210, the example identifier storage 310, the example initializer storage 372, the example collector storage 376 and the example reordering storage 382.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device (s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives. In this example, the mass storage 728 can also implement any of the example image/ video data storage 210, the example identifier storage 310, the example initializer storage 372, the example collector storage 376 and the example reordering storage 382.

The coded instructions 732 of FIGS. 5 and 6 may be stored in the mass storage device 728, in the volatile memory 714, in the non-volatile memory 716, and/or on a removable tangible computer readable storage medium such as a CD or DVD.

From the foregoing, it will be appreciated that example methods, apparatus and articles of manufacture have been disclosed that reduce the time required to enhance image/video data in a computer vision processing system. Disclosed methods, apparatus and articles of manufacture achieve this reduction in processing time by partitioning a set of linear equations into subsets that can be solved in parallel. The subsets of equations are supplied to a set of one or more successive over-relaxation processor(s) for solving in parallel. By solving at least some of the equations in parallel, the image/video data is processed far more quickly thereby enabling the usage of successive over-relaxation processors-based computer vision systems in real-time and/or near-real time applications.

The following further examples are disclosed herein.

Example 1 is an apparatus to prepare a set of equations for a successive over relaxation processor and includes an identifier to identify the set of equations. Respective ones of the set of equations correspond to respective pixels of an input image. The apparatus also includes a partitioner to divide the set of equations into partitions that contain mutually independent subsets of the equations. A collector of the apparatus collects the subsets of the set of equations into groups, based on the partitions, and the equations included in a group are to be solved in parallel by the successive over relaxation processor.

Example 2 is the apparatus of Example 1, wherein respective ones of the set of equations are stored in respective elements of a matrix, and the collector is to collect the subsets of the set of equations into groups by re-positioning the equations in the matrix.

Example 3 is the apparatus of Example 1. In Example 3, the partitioner includes a matrix initializer to initialize elements of a matrix to zero, a masker to successively mask the values of the matrix over a set of iterations, a value selector to successively select non-zero values for respective ones of the elements of the matrix based on values of the subsets of elements masked by the mask, and a value replacer to replace the zero values of the matrix with the non-zero values selected by the value selector.

Example 4 is the apparatus of Example 3, wherein the masker is to mask the values of the matrix by defining a mask having a shape and placing the center of the mask over respective ones of the values of the matrix during respective iterations.

Example 5 is the apparatus of Example 4, wherein the shape is defined by a type of pixel connectivity.

Example 6 is the apparatus of any of Examples 3 and 4, wherein the matrix is a first matrix and the set of equations are arranged in a second matrix when identified by the identifier. In the apparatus of Example 6, the first matrix and the second matrix have the same dimensions, and the collector is to collect the subsets of the set of equations into groups by re-positioning respective ones of the set of equations in the second matrix based on the non-zero values stored in respective, corresponding positions of the first matrix.

Example 7 is the apparatus of Example 6, wherein the collector is to re-position the respective ones of the set of equations by placing the respective ones of the set of equations corresponding to a first non-zero value in a first set of rows of the second matrix and placing the respective ones of the set of equations corresponding a second non-zero value in a second set of rows of the second matrix. In Example 7, the first and second sets of rows are different sets of rows.

Example 8 is one or more non-transitory machine-readable storage media including machine-readable instructions that, when executed, cause one or more processors to at least identify a set of equations to be solved. In Example 8, respective ones of the set of equations correspond to respective pixels of an input image. The instructions of Example 8 further cause one or more processors to divide the set of equations into partitions that contain mutually independent subsets of the equations. The instructions also cause the one or more processors to, based on the partitions, place the subsets of the set of equations into groups to be solved in parallel by a set of successive over relaxation processors. In Example 8, results generated by the successive over-relaxation processors form an enhanced version of the input image.

Example 9 is the one or more non-transitory machine-readable storage media of Example 8, wherein the set of equations are arranged in a matrix, and the subsets of the set of equations are placed into the groups by rearranging the positions of the equations in the matrix so that equations included in a same subset are near each other in the matrix.

Example 10 is the one or more non-transitory machine-readable storage media of Example 8, wherein the instructions to divide the set of equations include instructions to cause the one or more processors to populate a matrix with zero values, define a mask based on a relationship between the pixels, iteratively place the mask on the matrix of zero values with the mask centered on respective ones of the zero values in the matrix during respective iterations, during respective iterations, select respective non-zero values corresponding to the respective ones of the zero values, based on the coverage of the matrix by the mask, and, during respective iterations, replace, in the matrix, the respective zero values with the respective, selected non-zero values.

Example 11 is the one or more non-transitory machine-readable storage media of any of Examples 8-10, wherein the set of equations is identified based on an assumption about the pixels.

Example 12 is the one or more non-transitory machine-readable storage media of Example 10, wherein a shape of the mask is based on the connectivity of the pixels.

Example 13 is the one or more non-transitory machine-readable storage media of Example 10, wherein the respective non-zero values are selected based on elements of the matrix that are not covered by the mask.

Example 14 is the one or more non-transitory machine-readable storage media of any of Examples 10, 12, and 14, wherein equations corresponding to a first non-zero value are included in a first subset, equations corresponding to a second non-zero value are included in a second subset, and the instructions to cause the one or more processors to place the subsets of the equations into groups further includes instructions to cause the one or more processors to place the first subset of equations into a first set of rows of the matrix and place the second subset of equations into a second set of rows of the matrix.

Example 15 is the one or more non-transitory machine-readable storage media of Example 14, wherein the instructions further cause the one or more processors to supply the subset of equations corresponding to a row of the matrix as parallel inputs to the set of successive over relaxation processors.

Example 16 is an apparatus to prepare equations for a successive over relaxation processor that includes means to identify the equations, wherein respective ones of the set of equations correspond to respective pixels of an input image. The apparatus of Example 16 also includes means to divide the equations into partitions that contain mutually independent subsets of the equations, and means to collect the subsets of the equations into groups to be solved in parallel by the successive over relaxation processor.

Example 17 is the apparatus of Example 16, wherein respective ones of the equations are stored in respective elements of a matrix, and the means to collect collects the subsets of the equations into groups by re-positioning the equations in the matrix.

Example 18 is the apparatus of Example 16, wherein the means to divide include means to form a matrix of elements containing zeros, means to successively mask the elements of the matrix over a set of iterations, means to successively select non-zero values for respective ones of the elements of the matrix based on values of the subsets of elements masked by the mask, and means to replace the zero values of the matrix with the non-zero values selected by the value selector.

Example 19 is the apparatus of Example 18, wherein the means to successively mask the values of the matrix defines a mask having a shape and places the center of the mask over respective ones of the values of the matrix during respective iterations.

Example 20 is the apparatus of Example 19, wherein the shape of the mask is defined by a type of pixel connectivity.

Example 21 is the apparatus of any of Examples 18-20, wherein the matrix is a first matrix, the equations are arranged in a second matrix when identified by the means to identify, the first matrix and the second matrix have the same dimensions, and the means to collect the subsets of the equations into groups re-positions respective ones of the set of equations in the second matrix based on the non-zero values stored in respective, corresponding positions of the first matrix.

Example 22 is the apparatus of Example 21, wherein the means to collect is to re-position the respective ones of the set of equations by placing the respective ones of the set of equations corresponding to a first non-zero value in a first set of rows of the second matrix and placing the respective ones of the set of equations corresponding a second non-zero value in a second set of rows of the second matrix. In Example 22, the first and second sets of rows are different sets of rows.

Example 23 is a method to parallelize solving a set of linear equations associated with image data and includes identifying, by executing an instruction with a processor, equations to be solved, respective ones of the equations corresponding to respective pixels of the image data, determining, by executing an instruction with the processor, subsets of the equations that are mutually independent of each other; and supplying, by executing an instruction with the processor, the equations included in a subset to a successive over relaxation algorithm at a same time to be solved in parallel.

Example 24 is the method of Example 22, wherein the equations are arranged in a matrix, and the subsets of the equations are placed into the groups by rearranging the positions of the equations in the matrix so that equations included in a same subset are near each other in the matrix.

Example 25 is the method of Example 22, wherein the determining of the subsets includes initializing a matrix of zero values, defining a mask based on a connectivity of the pixels, placing the mask on the matrix of zero values with the mask centered on respective ones of the zero values in the matrix during a set of iterations, during respective ones of the set of iterations, selecting respective non-zero values corresponding to the respective ones of the zero values, based on the coverage of the matrix by the mask, and, during respective ones of the set of iterations, replacing, in the matrix, the respective zero values with the respective, selected non-zero values.

Example 26 is a machine readable medium including code, when executed, to cause a machine to realize the apparatus of any of Examples 16-22.

Example 27 is a machine-readable storage including machine-readable instructions, when executed, to implement a method or realize an apparatus as included in any preceding example.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to prepare a set of equations for a successive over relaxation processor, the apparatus comprising:
    an identifier to identify the set of equations, respective ones of the set of equations corresponding to respective pixels of an input image;
    a partitioner to divide the set of equations into partitions, the partitions containing mutually independent subsets of the equations, the partitioner including:
        a matrix initializer to initialize elements of a matrix to zero;
        a masker to successively mask the values of the matrix over a set of iterations;
        a value selector to successively select non-zero values for respective ones of the elements of the matrix based on values of the subsets of the elements masked by the mask; and
        a value replacer to replace the zero values of the matrix with the non-zero values selected by the value selector; and
    a collector to collect the subsets of the set of equations into groups, based on the partitions, the equations included in at least one of the groups to be solved in parallel by the successive over relaxation processor, the identifier, the partitioner, the matrix initializer, the masker, the value selector, the value replacer and the collector implemented by at least one of: (i) hardware or (ii) at least one processor.

2. The apparatus of claim 1, wherein the matrix is a first matrix, respective ones of the set of equations are stored in respective elements of a second matrix, and the collector is to collect the subsets of the set of equations into groups by re-positioning the equations in the second matrix.

3. The apparatus of claim 1, wherein the masker is to mask the values of the matrix by defining a mask having a shape and placing the center of the mask over respective ones of the values of the matrix during respective ones of the iterations.

4. The apparatus of claim 3, wherein the shape is defined by a type of pixel connectivity.

5. The apparatus of claim 1, wherein the matrix is a first matrix, the set of equations are arranged in a second matrix when identified by the identifier, the first matrix and the second matrix having the same dimensions, and the collector is to collect the subsets of the set of equations into groups by re-positioning respective ones of the set of equations in the second matrix based on the non-zero values stored in respective, corresponding positions of the first matrix.

6. The apparatus of claim 5, wherein the collector is to re-position the respective ones of the set of equations by placing the respective ones of the set of equations corresponding to a first non-zero value in a first set of rows of the second matrix and placing the respective ones of the set of equations corresponding a second non-zero value in a second set of rows of the second matrix, the first and second sets of rows being different sets of rows.

7. One or more non-transitory machine-readable storage media comprising machine-readable instructions that, when executed, cause one or more processors to at least:
   identify a set of equations to be solved, respective ones of the set of equations corresponding to respective pixels of an input image;
   divide the set of equations into partitions, the partitions containing mutually independent subsets of the equations, wherein to divide the set of equations into partitions, the instructions, when executed, cause the one or more processors to:
   populate a matrix with zero values;
   define a mask based on a relationship between the pixels;
   iteratively place the mask on the matrix of zero values with the mask centered on respective ones of the zero values in the matrix during respective iterations;
   during the respective iterations, select respective non-zero values corresponding to the respective ones of the zero values, based on the coverage of the matrix by the mask; and
   during the respective iterations, replace, in the matrix, the respective zero values with the respective, selected non-zero values; and
   based on the partitions, place the subsets of the set of equations into groups to be solved in parallel by a set of successive over relaxation processors, results generated by the successive over-relaxation processors forming an enhanced version of the input image.

8. The one or more non-transitory machine-readable storage media of claim 7, wherein the matrix is a first matrix, the set of equations are arranged in a second matrix, and the subsets of the set of equations are placed into the groups by rearranging the positions of the equations in the second matrix so that equations included in a same subset are near each other in the matrix.

9. The one or more non-transitory machine-readable storage media of claim 7, wherein the equations are identified based on an assumption about the pixels.

10. The one or more non-transitory machine-readable storage media of claim 7, wherein a shape of the mask is based on the connectivity of the pixels.

11. The one or more non-transitory machine-readable storage media of claim 7, wherein the respective non-zero values are selected based on elements of the matrix that are not covered by the mask.

12. The one or more non-transitory machine-readable storage media of claim 7, wherein equations corresponding to a first non-zero value are included in a first subset, equations corresponding to a second non-zero value are included in a second subset, and the instructions to cause the one or more processors to place the subsets of the equations into groups include instructions to cause the one or more processors to place the first subset of equations into a first set of rows of the matrix and place the second subset of equations into a second set of rows of the matrix.

13. The one or more non-transitory machine-readable storage media of claim 12, wherein the instructions, when executed, further cause the one or more processors to supply the subset of equations corresponding to a row of the matrix as parallel inputs to the set of successive over relaxation processors.

14. An apparatus to prepare equations for a successive over relaxation processor, the apparatus comprising:
   means for identifying the equations, respective ones of the set of equations corresponding to respective pixels of an input image;
   means for dividing the equations into partitions, the partitions containing mutually independent subsets of the equations, the means for dividing to:
   form a matrix of elements containing zeros;
   successively mask the elements of the matrix over a set of iterations;
   successively select non-zero values for respective ones of the elements of the matrix based on values of the subsets of the elements masked by the mask; and
   replace the zero values of the matrix with the non-zero values selected by the value selector; and
   means for collecting the subsets of the equations into groups to be solved in parallel by the successive over relaxation processor.

15. The apparatus of claim 14, wherein the matrix is a first matrix, respective ones of the equations are stored in respective elements of a second matrix, and the means for collecting is to collect the subsets of the equations into groups by re-positioning the equations in the second matrix.

16. The apparatus of claim 14, wherein the means for dividing is to define a mask having a shape and place the center of the mask over respective ones of the values of the matrix during respective ones of the iterations.

17. The apparatus of claim 16, wherein the shape of the mask is defined by a type of pixel connectivity.

18. The apparatus of claim 14, wherein the matrix is a first matrix, the equations are arranged in a second matrix when identified by the means for identifying, the first matrix and the second matrix having the same dimensions, and the means for collecting the subsets of the equations into groups is to re-position respective ones of the set of equations in the second matrix based on the non-zero values stored in respective, corresponding positions of the first matrix.

19. The apparatus of claim 18, wherein the means for collecting is to re-position the respective ones of the set of equations by placing the respective ones of the set of equations corresponding to a first non-zero value in a first set of rows of the second matrix and placing the respective ones of the set of equations corresponding a second non-zero value in a second set of rows of the second matrix, the first and second sets of rows being different sets of rows.

20. A method to parallelize solving a set of linear equations associated with first image data, the method including:
   identifying, by executing one or more instructions with one or more processors, equations to be solved, respective ones of the equations corresponding to respective pixels of the first image data, the equations arranged in a first matrix;
   determining, by executing one or more instructions with the one or more processors, subsets of the equations that are mutually independent of each other based on a second matrix, the determining of the subsets of the equations including:
   initializing elements of the second matrix to zero;
   successively masking the elements of the second matrix over a set of iterations;
   successively selecting, during respective ones of the iterations, non-zero values for respective ones of the elements of the second matrix based on values of subsets of the elements masked by the mask; and during the respective ones of the iterations, replacing, in the second matrix, respective zero values with the corresponding, selected non-zero values;

placing, by executing one or more instructions with the one or more processors, the subsets of the equations into groups by rearranging the positions of the equations in the first matrix based on the second matrix so that equations included in a same subset are near each other in the first matrix;

supplying, by executing one or more instructions with the one or more processors, the groups of equations to a plurality of successive over relaxation processors; and solving the groups of equations in parallel with the successive over relaxation processors to determine second image data.

21. A method to parallelize solving a set of linear equations associated with first image data, the method including:

identifying, by executing one or more instructions with one or more processors, equations to be solved, respective ones of the equations corresponding to respective pixels of the first image data;

determining, by executing one or more instructions with the one or more processors, subsets of the equations that are mutually independent of each other, the determining of the subsets including:

initializing a matrix of zero values;

defining a mask based on a connectivity of the pixels;

placing the mask on the matrix of zero values with the mask centered on respective ones of the zero values in the matrix during a set of iterations;

during respective ones of the iterations, selecting respective non-zero values corresponding to the respective ones of the zero values, based on the coverage of the matrix by the mask; and during respective ones of the iterations, replacing, in the matrix, the respective zero values with the respective, selected non-zero values; and supplying, by executing one or more instructions with the one or more processors, the subsets of equations to a plurality of successive over relaxation processors; and solving the subsets of equations in parallel with the successive over relaxation processors to determine second image data.

* * * * *